United States Patent [19]

Faulhaber

[11] 3,955,096

[45] May 4, 1976

[54] IMPLICIT RATIO COMPUTER FOR SEQUENTIAL SIGNALS

[75] Inventor: Mark Edwin Faulhaber, Wilmington, Del.

[73] Assignee: E. I. Du Pont de Nemours and Company, Wilmington, Del.

[22] Filed: June 19, 1975

[21] Appl. No.: 588,643

[52] U.S. Cl............................ 250/565; 250/214 R; 250/575; 324/140 D; 328/161; 356/205
[51] Int. Cl.[2]...................... G01N 21/22; H03K 5/18
[58] Field of Search......... 250/565, 573, 575, 214 R, 250/236; 356/97, 93, 201, 205; 324/140 D; 328/161

[56] References Cited
UNITED STATES PATENTS

| | | | |
|---|---|---|---|
| 3,071,037 | 1/1963 | Brumley | 250/565 X |
| 3,329,821 | 7/1967 | Lesage | 250/565 X |
| 3,652,930 | 3/1972 | Sugiyama et al. | 324/140 D X |
| 3,787,124 | 1/1974 | Lowy et al. | 356/205 |
| 3,875,519 | 4/1975 | Warren | 328/161 |

Primary Examiner—Alfred E. Smith
Assistant Examiner—E. R. LaRoche

[57] ABSTRACT

An electrical signal ratioing circuit for a source delivering an electric analog pulse signal sequence having compensating means for removing the effects of background influences, such as amplifier signal offsets and extraneous illumination, and integrating means eliminating the effect of line voltage variations and changes in optical and electrical system gains on the ratios so produced.

6 Claims, 9 Drawing Figures

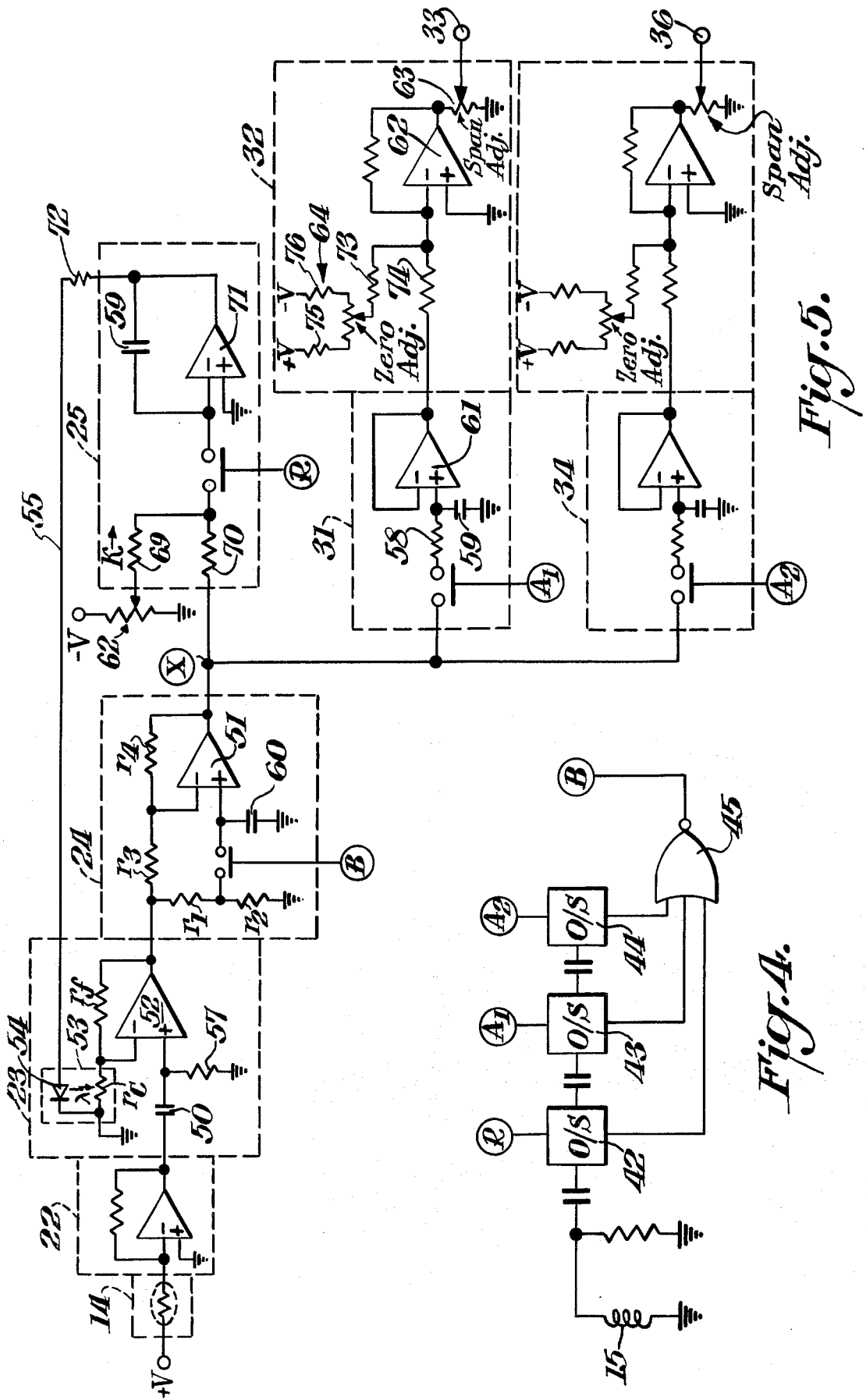

IMPLICIT RATIO COMPUTER FOR SEQUENTIAL SIGNALS

BRIEF SUMMARY OF THE INVENTION

Generally, this invention relates to an electrical signal ratioing circuit for a source delivering an electric analog pulse sequence comprising measured parameter signals $A_1, A_2 \ldots A_n$, at least one reference signal R, and, possibly, a background signal B, having signal gating and timing means provided with signal identification means maintaining time coordination with the signal pulse sequence and gate actuating means responsive to the signal identification means actuating, for predetermined time durations, the respective gates corresponding to the signals $A_1, A_2 \ldots A_n$, R and B, an amplifier which imparts a gain G to the signals, a gated clamp which subtracts the product (GB) of the amplifier gain G and the background signal B from the signal pulse sequence, a gated integrator which, during the gated period wherein the reference signal R is delivered, has a first input terminal receiving the sum of the background — corrected signal sequence of a given polarity from the gated clamp and a substantially constant d-c reference voltage K of opposite polarity, and a second input terminal connected to ground, means supplying the integrator output to control a gain-determining resistance for the amplifier, and individual parallel circuits sampling the individual signal ratios $KA_1/R, KA_2/R \ldots KA_n/R$ during the successive time periods wherein each is output from the gated clamp.

DRAWINGS

Figure 1:
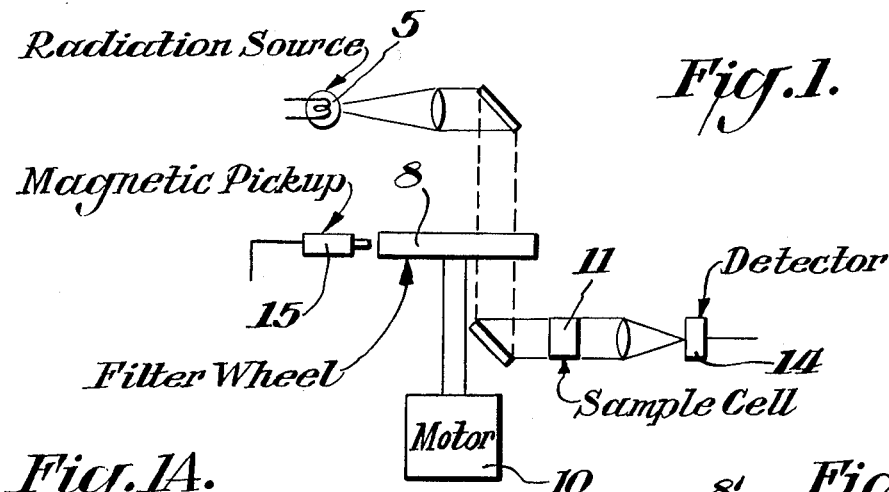
Figures 1A, 1B:
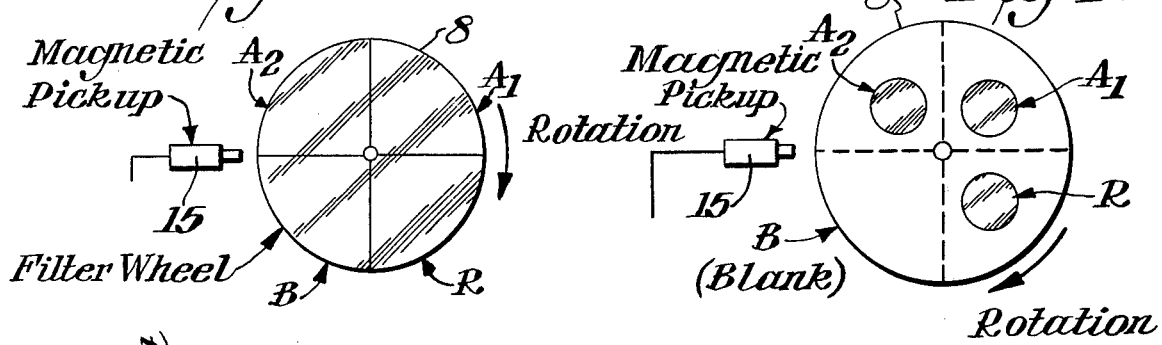
Figure 2A:
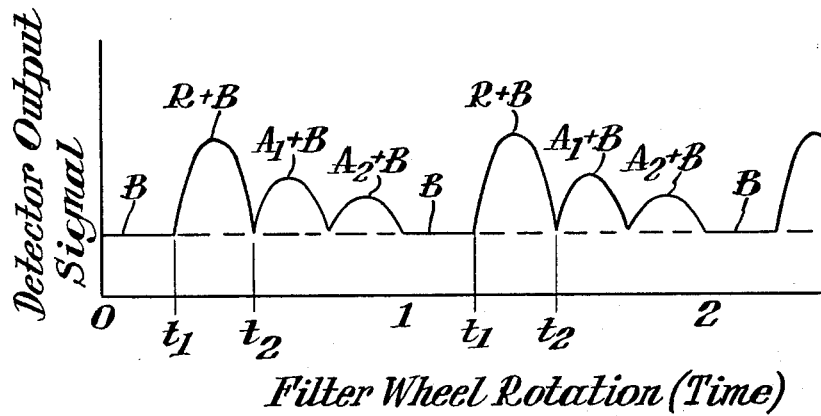
Figure 2B:
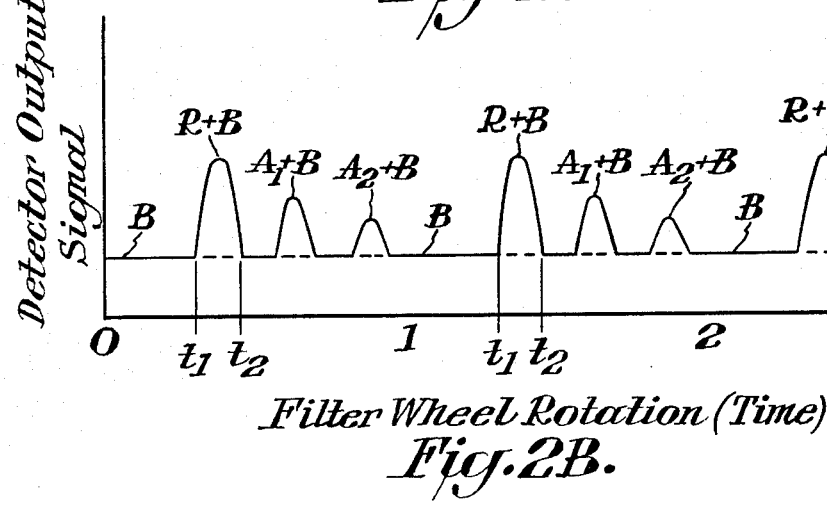
Figures 3, 6:
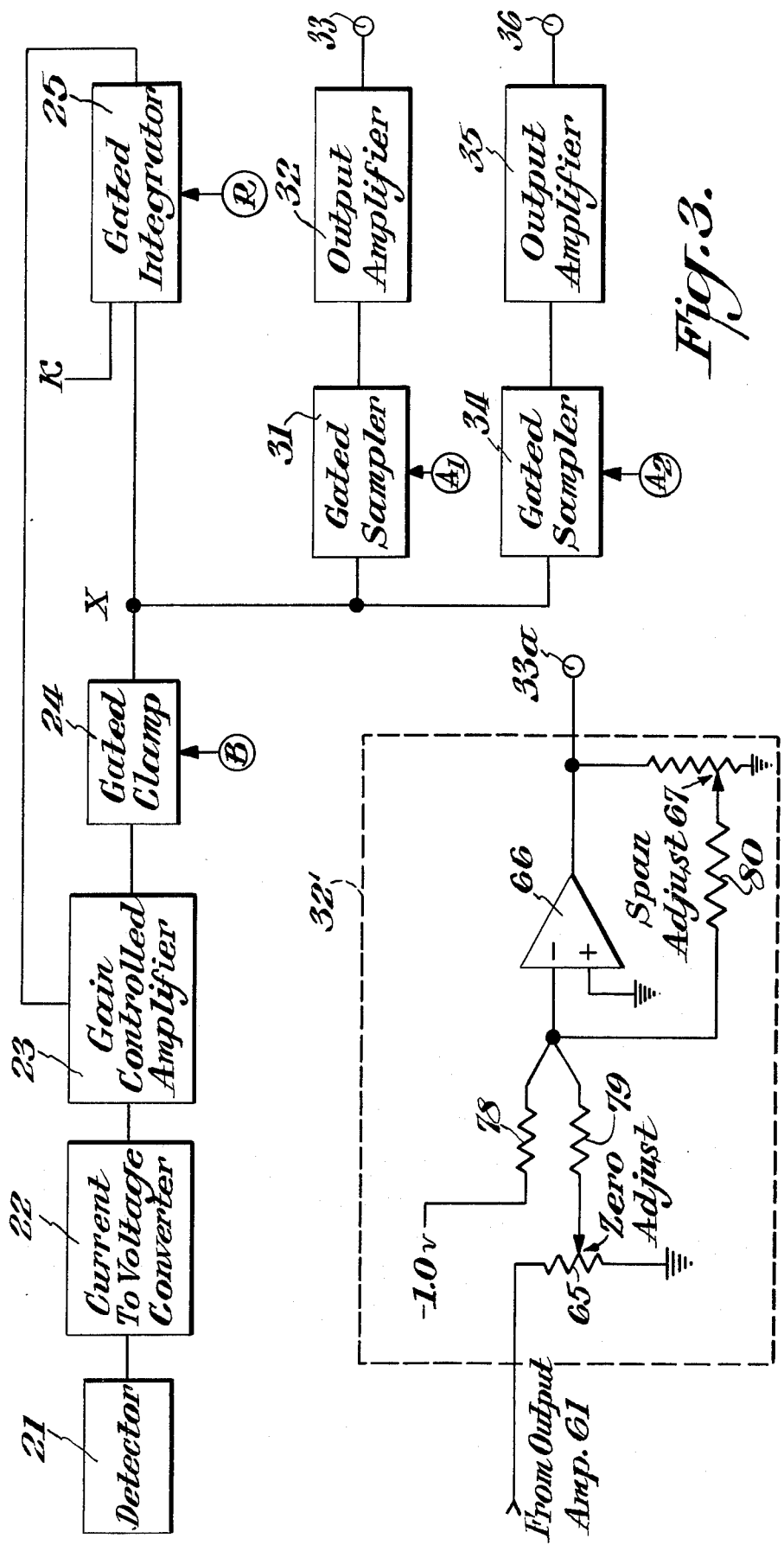

The following drawings constitute part of this specification, in which:

FIG. 1 is a schematic representation in side elevation of a photometric apparatus according to this invention, FIG. 1A is a plan view of a sector type radiation filter wheel which can be employed in the apparatus of FIG. 1, FIG. 1B is a plan view of a radiation filter wheel provided with circular filters which can be employed in the apparatus of FIG. 1, FIG. 2A is a schematic representation of amplitude v. time for the electric analog signals obtained using the filter wheel of FIG. 1A, FIG. 2B is a schematic representation of amplitude v. time for the electric analog signals obtained using the filter wheel of FIG. 1B, FIG. 3 is a block diagram of a preferred embodiment of the electrical circuitry used with the apparatus of FIG. 1, FIG. 4 is a partially schematic representation of one design of electrical gating circuit for use with the circuitry of FIG. 3, FIG. 5 is a partially schematic representation of the electrical circuitry of FIG. 3 but in greater detail, and FIG. 6 is a circuit diagram of a signal read-out effecting logarithmic ratioing.

THE INVENTION

This invention comprises electrical circuitry for extracting information from an electric analog signal sequence which includes sequential data pulses, and the information extracted is obtained as the ratio, or ratios, of combinations of these sequential pulses.

Referring to FIG. 1, the invention is particularly useful for the processing of the output signal from a photodetector constituting part of a filter photometer.

The photometer utilizes a radiation source 5 emitting radiation which, upon filtering, gives radiation wavelengths preferentially absorbed according to the Lambert-Beer Law by a multiplicity of components which it is desired to analyze, which are placed in, or flowed through, a radiation transmitting sample cell 11. Transmitted radiation is transduced to electric analog signals by conventional photodetector 14. In this apparatus a sequence of signals is obtained in regular time succession by a rotating filter wheel 8 which is driven at relatively high speed by motor 10. A magnetic pick-up 15, disposed at close clearance radially of filter wheel 8, generates a signal responsive to the circumferential passage of a small ferrous shim (not shown) mounted on the periphery of filter wheel 8 which coordinates, in time, circuit operation and gating with the successive interpositionings of the several radiation filters across the analytical radiation beam.

The sector type filter wheel 8 of FIG. 1A is, typically, made up of four quadrant sectors consisting of the two sample parameter radiation transmitters $A_1$ and $A_2$, the reference transmitter R and the radiation-opaque sector B.

The electrical signal sequence output by detector 15 is, with sector filtering, a train of electrical pulses having an amplitude variation with time as depicted in FIG. 2A.

It may be desirable to employ a filter wheel 8' of greater physical strength, or one in which the signal pulses are spaced apart at greater time intervals, and this can be achieved with the filter wheel of FIG. 1B, the electrical signal sequence of which is that depicted in FIG. 2B.

The objective of my invention is to obtain the ratios of signals such as $A_1/R, A_2/R \ldots A_n/R$, and it is also practicable to obtain the ratios of specific parameter signals with respect to several references, e.g., $A_1/(R_1 + R_2), A_2/(R_1 + R_2) \ldots A_n/(R_1 + R_2)$.

To accomplish this, it is necessary to eliminate the background contribution, especially in infra-red region analyses, because $(A_1 + B)/(R + B) \neq A_1/R$. It is also desirable to compensate, or eliminate, optical and electronic system variations which do not represent true variations in the values of $A_1$, $A_2$ and R, examples of which are gain changes, e.g., dirt accumulations in the optics and line voltage variations or the existence of background such as amplifier signal offsets and extraneous illumination.

Moreover, it is necessary to provide precise timing and gating facilities which permit processing each individual sequential data pulse of the train.

Preferred circuitry for accomplishing this is shown in block diagram in FIG. 3 for an infra-red radiation photometer wherein the output signal from detector 14 is routed first to a current-to-voltage converter 22, then to a gain-controlled amplifier 23, then to gated clamp 24, the output of which is summed with a substantially constant d-c voltage K of opposite polarity in gated integrator 25. The output signal of gated integrator 25 is utilized as feedback for gain-controlled amplifier 23, as hereinafter described.

In operation, the gains of amplifiers 22 and 23 in combination can be considered to have the value G. Then the sequential signals depicted in FIGS. 2A and 2B have sequential components with amplitudes GB, G(R+B), G(A₁+B), G(A₂+B), GB, G(R+B) and so on in repetition of the scanning cycle.

The first essential is to eliminate the amplified background level GB, and this is accomplished in gated clamp 24 which subtracts the value GB from the entire signal, thereby effectively moving the zero base line to the position indicated by the broken horizontal lines in FIGS. 2A and 2B.

The next operation on the signal is the subtraction of the reference voltage, K, from the GR portion of the signal, followed by integration of the difference (GR-K) during the gated period in which reference R occurs. This is accomplished by the gated integrator 25. The integrator output is employed as feedback to the gain-controlled amplifier 23 such that the average of the integrated values of (GR-K) over the time interval of the R component of the pulse sequence is equal to zero. Expressed mathematically, when $$\left[ \int_{t_1}^{t_2} (GR-K) \cdot dt \right]_{avg.} = 0,$$

where $t_1$ and $t_2$ are the time period limits of the R pulse as shown in FIGS. 2A and 2B, $K=GR$ or $G=K/R$, so that the combined action of the gated integrator 25 and the gated clamp 24 in the feedback configuration described produces an output signal at point X in the loop which is in the sequence: O, K, KA₁/R, KA₂/R, O, K, and so forth in repetition of the cycle. Thus, the signal sequence as it exists at point X is independent of gain changes, i.e., the effects of G, and is also devoid of background error, i.e., the effects of B. Moreover, the pulse sequence is now in useful ratio form modified only by an arbitrary constant K, introduced as a fixed reference, which can have any preselected convenient value, including unity.

Referring again to FIG. 3, the signal at X is analyzed by two identical parallel sampling circuits, the first of which is provided with a gated sampler 31 which is gated to sample the signal sequence for the duration of the pulse A₁. There is thereby obtained an averaged value of the pulse which is amplified in output amplifier 32 to give a signal representative of the ratio A₁/R which can be passed to a voltmeter, recorder, or other output device from terminal 33. The second circuit branch is provided with gated sampler 34 which is gated to sample the signal sequence for the duration of the pulse A₂. There is thereby obtained an averaged value of the pulse which is routed to output amplifier 35, giving a representation of A₂/R, which can be passed to a suitable output device from terminal 36.

Gating and timing pulses for actuation of gated clamp 24, gated integrator 25 and the gated samplers 31 and 34 can be provided by a number of conventional digital devices. One typical design can be that shown in block diagram in FIG. 4.

Here magnetic pick-up 15, disposed in peripheral proximity to the rotating filter wheel 8 (or 8') in FIGS. 1, 1A and 1B, produces a triggering pulse once during each filter wheel rotation. This triggering pulse is routed to three 'one-shots' in series, the first, 42, producing a triggering pulse for sample period R, which is supplied to gated integrator 25 as indicated by the encircled pulse identification in FIGS. 3 and 4. After a suitable predetermined time delay, one-shot 42 triggers one-shot 43, thereby producing a triggering pulse for sample period A₁, which is applied to gated sampler 31. Then, after a suitable predetermined time delay, time delay one-shot 43 triggers one-shot 44, thereby producing a triggering pulse for sample period A₂, which is applied to gated sampler 34.

Outputs are also taken from the one-shot 42, 43 and 44 during their "on" periods which are supplied to NOR gate 45, so that, when no pulse is present on any of the three input lines to NOR gate 45, it produces an output pulse. This latter condition exists only during the period when the B sector (or opaque portions of the apertured filter wheel) is interposed across the optical path. Thus, the output pulse from NOR gate 45 then produces a triggering pulse for the sampling period B to be applied to gated clamp 24.

In a typical apparatus, filter wheel 8 (or 8') is rotated at 1800 rpm, so that magnetic pick-up 15 pulses at about 33 millisecond time intervals. When the one-shots 42, 43 and 44 are preset for a pulse length of about 8 ms, the circuit of FIG. 4 produces gating signals in proper synchronization with each filter wheel radiation type and also for the corresponding gated devices in the ratio computing circuit.

FIG. 5 is an electronic circuit schematic drawing showing the principal components of an implicit ratioing circuit constructed for processing the sequential signals of an infra-red radiation spectrometer. The individual devices corresponding to the functional blocks of FIG. 3 are shown by enclosing broken line representation in FIG. 5.

In this design the sequential signal from detector 14 is transformed into a voltage signal in amplifier 22. In some cases it is necessary to capacitively couple the detector to the amplifier in infra-red analyzers in order to eliminate the large bias value needed to operate the detector which is present in the analytical signal. Therefore a capacitor 50 is employed for transmission of the sequential signal to gain-controlled amplifier 23. Resistor 57 is a voltage referencing (or maintaining) resistor. As hereinbefore described, the signal output from amplifier 23 has the successive magnitudes GB, G(R+B), G(A₁+B), G(A₂+B), etc., at the input of gated clamp 24.

When the GB pulse of the signal sequence occurs, the B gating signal from the circuit of FIG. 4 completes the circuit between the junction of the two resistors $r_1$ and $r_2$ (typically each 100 Kohm value) and capacitor 60 (typically 0.02 uf), connected between the positive input terminal of operational amplifier 51 and ground. Thus, with a signal level of GB appearing at the input, i.e., the junction of $r_1$ and $r_3$ (typically each 100 Kohms) the signal level at the junction of resistors $r_1$ and $r_2$ will be ½ GB, and this voltage level is impressed on capacitor 60. For the signal level at point X to be zero, the signal at the negative input terminal of operational amplifier 51 must also be ½ GB, and this will appear at the junction of the 100K resistors $r_3$ and $r_4$.

When the B gating signal ceases, at the end of the GB segment of the signal, the circuit between the junction of $r_1$ and $r_2$ and the capacitor 60 opens, whereupon the voltage level of ½ GB is held by the capacitor at the positive input terminal of amplifier 51, which continues to maintain a voltage of ½ GB at the negative input terminal. It is to be noted that there is essentially no signal level drop, because the only leakage path for capacitor 60 is through the extremely high impedance of amplifier 51.

Now, at the occurrence of the G(R+B) or GR+GB segment of the signal, there is no gating signal and the voltage level of ½ GB is still present at the positive and negative terminals of amplifier 51. Considering this composite signal and evaluating the effect of the GB portion of this signal segment imposed at the input of the series equal valued resistor pair $r_3$ and $r_4$, for the voltage ½ GB to appear at the junction of resistors $r_3$ and $r_4$, which is the negative input of amplifier 51, the voltage at X must be zero. Then considering the GR portion of this same composite signal segment, with a signal level of GR imposed at the input point of resistor pair $r_3$ and $r_4$, and solving for the voltage at point X, the following is true: GR+GB is input to $r_3$. Since ½ GB exists at the negative polarity input of amplifier 51, the voltage drop across $r_3 = $ (GR+GB) − ½ GB. This equals the voltage drop across resistor $r_4$, which is ½ GB minus that existing at point X.

Therefore, solving for the voltage at X: (GR+GB) − ½ GB = ½ GB-X and, after simplifying, X = −GR.

Thus, clamping a value of ½ GB at the positive input terminal of amplifier 51 effectively subtracts GB from each of the subsequent segments of the sequential signal, with the result that the successive background corrected signal outputs at point X will be: O, −GR, −GA$_1$, −GA$_2$, O, −GR, etc. The −GR signal values are, of course, those used by the gated integrator 25 to produce feedback voltage values to gain-controlled amplifier 23.

Referring again to FIG. 5, the output of amplifier 52 is fed back to its negative input terminal through resistor $r_f$, which is also connected to ground through the light-sensitive resistor, $r_c$, which is part of the light feedback component 53 (typically a Clairex "Photomod" CLM6000 which combines, in a single radiation-tight housing, the light-emitting diode 54 with $r_c$). The resistance of $r_c$ varies inversely with the intensity of the radiation impinging on it from diode 54, resistance values changing, typically, several orders of magnitude in range from light to dark. The gain $G_{52}$ of amplifier 52 in this configuration is $(1 + r_f/r_c)$.

In operation, if the gain of amplifier 22 decreases slightly, then the amplitude of all of the signal pulses becomes a little smaller. When the reference signal R switches integrator 25 on, a smaller value, G'R will be combined with K for integration. Since this G'R does not equal K, as previously mentioned, the resulting difference is integrated, producing a signal which, via line 55, increases the light output of diode 54 in the radiation feedback component 53. This, in turn, decreases the resistance of $r_c$, which thereupon increases the gain of amplifier 52. This increase continues until the time average value of $$\int_{t_1}^{t_2} (G'R-K)dt$$

is made equal to the initial time average level $$\int_{t_1}^{t_2} (GR-K)dt.$$

Thus, not only is gain stabilization achieved based on the size of a predetermined constant K but there is also obtained the ratioing function desired. It might be mentioned that 62 is a voltage selection potentiometer, resistors 69 and 70 are current summing resistors, amplifier 71 is an operational amplifier connected as an integrator and resistor 72 is a current-limiting resistor for diode 54.

The particular light feedback arrangement shown for gain-controlled amplifier 23 was chosen from several alternate positions of light-sensitive resistor $r_c$ in the feedback input-output circuit. The arrangement described is preferred, because it provides a high, constant input impedance and a quasi-linear control function for the gain of the operational amplifier 52.

The individual signal read-out circuits are identical, as shown in FIG. 5, each being gated by its applicable parameter signal A$_1$ or A$_2$, as denoted.

Thus, gated sampler 31 is provided with a resistor 58 - capacitor 59 combination to effect averaging of the input signal. In addition capacitor 59 retains the average amplitude of the signal, so that a KA$_1$/R signal is held throughout the full signal sequence cycle. Block 42 includes a zero adjust circuit for chart recorder pen adjustment indicated generally at 64, wherein the potentiometer is set at some convenient point between +V and −V such that a current is summed with the positive signal from amplifier 61. This is amplified in inverting amplifier 62, provided, on the output side, with a span-adjust voltage tap 63 which effectively compensates for the K term in the ratio output. Resistors 73 and 74 are current summing resistors and resistors 75 and 76 are range limiting resistors, the purpose of zero adjust 64 being to enable proper positioning of the pen of a recorder (not shown).

The foregoing description has been directed especially to a circuit for the basic ratioing A/R; however, it is practicable, by relatively simple circuit modifications, to effect logarithmic ratioing, i.e., log A/R, which is frequently useful in photometric systems for direct concentration measurements. Such a circuit is shown in FIG. 6 as block 32'. This circuit provides for adjusting the sensitivity of the A/R signal to a point where the function (1 − ZA/R) is most linear with −log A/R, i.e., at ZA/R = 1.0. The factor Z in the equation is the setting of zero adjustment potentiometer 65 which, having A/R applied thereto, produces, at its wiper contact a voltage proportional to the product ZA/R. This voltage is summed with a constant voltage of opposite polarity, conveniently shown as −1.0 volt drawn via current summing resistor 78 (having counterpart current summing resistor 79) and amplified by inverting amplifier 66 to a suitable level by span adjust 67. Resistor 80 is a feedback, and thus gain-determining resistor. This produces a voltage signal closely approximating −log A/R at output 33a, the output at this point having been set to zero volts initially using zero adjust potentiometer 65.

In addition, it is practicable to obtain the ratio (R−A)/(R+A) which ratio is a reasonable approximation to log A/R for values of A/R greater than about 0.5.

In some types of photometric analysis, such as visible and ultra violet light analyses, the detector sequential signal train is substantially free of background interference, so that it is then practicable to dispense with the gated clamp 24. However, the rest of applicant's circuit can still be used to determine the several ratios which are the primary objects of applicant's invention, and the following claims are therefore directed to both embodiments of the invention.

What is claimed is:

1. In an electrical signal ratioing circuit for a source delivering an electric analog signal pulse sequence comprising measured parameter signals $A_1, A_2 \ldots A_n$, and at least one reference signal R, signal gating and timing means having signal identification means maintaining time coordination with said signal pulse sequence, and gate actuating means responsive to said signal identification means actuating, for predetermined time durations, the respective gates corresponding to said signals $A_1, A_2 \ldots A_n$, and, R an amplifier which imparts a gain G to said signals, a gated integrator which, during the gated period wherein said reference signal R is delivered, has a first input terminal receiving the sum of said signal pulse sequence of a given polarity from said amplifier and a substantially constant d-c reference voltage K of opposite polarity, and a second input terminal connected to ground, means supplying said integrator output to control a gain — determining resistance for said amplifier, and individual parallel sampling circuits gating the individual signal ratios $KA_1/R, KA_2/R \ldots KA_n/R$ during the successive time periods wherein each is output from said amplifier.

2. In an electrical signal ratioing circuit for a source delivering an electrical analog signal pulse sequence having, additionally, a background signal B the apparatus of claim 1 wherein there is interposed between said amplifier and said gated integrator a gated clamp which subtracts the product (GB) of said amplifier gain G and said background signal B from said signal pulse sequence, and said individual signal ratios $KA_1/R, KA_2/R \ldots KA_nR$ are output from said gated clamp.

3. The apparatus of claim 2 wherein said parameter signals $A_1, A_2 \ldots A_n$ and said reference signal R are the respective electric analog signals of a filter photometer.

4. Apparatus according to claim 2 wherein said gated clamp comprises an operational amplifier having positive and negative polarity input terminals and first and second series - connected resistor pairs, each resistor having substantially the same resistance value, both resistor pairs being connected at one end to the output side of said voltage amplifier and said first resistor pair being connected to ground at its other end whereas said second resistor pair is connected at its other end to the output side of said operational amplifier, a feedback supply lead connected between the two resistors of said second resistor pair and the negative polarity input terminal of said operational amplifier, a signal input lead connected between the two resistors of said first resistor pair and said positive polarity input terminal of said operational amplifier, a voltage level-maintaining capacitor connected between said positive polarity input terminal of said operational amplifier and ground, and switching means responsive to said gating and timing means interposed between the midpoint of said first resistor pair and the ungrounded side of said capacitor.

5. Apparatus according to claim 2 wherein said amplifier is an operational amplifier having positive and negative polarity input terminals, said positive polarity input terminal being coupled through a capacitor to receive said electric analog signal pulse sequence, a voltage level-maintaining resistor connected between the positive terminal of said voltage amplifier and said coupling capacitor to ground, a feedback resistor connected between the output side of said voltage amplifier and said negative polarity input terminal, and an enclosed light feedback element comprising a light-sensitive resistor having a resistance varying inversely with the intensity of light impinging thereon connected between said negative terminal of said voltage amplifier and ground, and a light-emitter constituting the light source for said light-sensitive resistor connected as feedback between said integrator output and ground.

6. The apparatus of claim 2 wherein said individual parallel sampling circuits gating said individual signal ratios $KA_1/R, KA_2/R \ldots KA_n/R$ are each provided with a logarithmic read-out circuit having, in the order recited, a zero adjustment potentiometer delivering a voltage proportional to the product ZA/R, and means summing said product ZA/R with a constant voltage of opposite polarity to give a voltage closely approximating $-\log A/R$ for read-out via a span adjustment sub-circuit.

* * * * *

UNITED STATES PATENT AND TRADEMARK OFFICE
CERTIFICATE OF CORRECTION

PATENT NO. : 3,955,096
DATED : May 4, 1976
INVENTOR(S) : MARK EDWIN FAULHABER

It is certified that error appears in the above-identified patent and that said Letters Patent are hereby corrected as shown below:

Col. 2, line 27, "15" should read --14--;

Col. 3, lines 20-23, " $\left[\int_{t_1}^{t_2} (GR-K)-\frac{}{dt}\right]$ " should read --$\left[\int_{t_1}^{t_2} (GR-K)dt\right]_{avg.}$--;

Col. 4, line 7, "one-shot" should read --one-shots--;
Col. 6, line 20, "42" should read --32--;
Col. 7, line 34, "KA$_n$R" should read --KA$_n$/R--.

Signed and Sealed this

Sixth Day of July 1976

[SEAL]

Attest:

RUTH C. MASON
Attesting Officer

C. MARSHALL DANN
Commissioner of Patents and Trademarks